United States Patent
Heberger et al.

(10) Patent No.: US 6,663,956 B2
(45) Date of Patent: Dec. 16, 2003

(54) ANTISTATIC COATING AND COATED FILM

(75) Inventors: John M. Heberger, Greer, SC (US); Robin M. Donald, Greer, SC (US)

(73) Assignee: Mitsubishi Polyerster Film, LLC, Greer, SC (US)

( * ) Notice: Subject to any disclaimer, the term of this patent is extended or adjusted under 35 U.S.C. 154(b) by 63 days.

(21) Appl. No.: 10/119,902

(22) Filed: Apr. 10, 2002

(65) Prior Publication Data

US 2003/0035947 A1 Feb. 20, 2003

Related U.S. Application Data

(60) Provisional application No. 60/286,798, filed on Apr. 26, 2001.

(51) Int. Cl.$^7$ .................................................. B32B 5/16
(52) U.S. Cl. ........................ 428/332; 428/331; 428/409
(58) Field of Search ................................. 428/323, 331, 428/332, 409; 427/384, 385.5, 388.1, 388.4; 252/500, 512, 518

(56) References Cited

U.S. PATENT DOCUMENTS

| | | | |
|---|---|---|---|
| 5,294,372 | A | 3/1994 | Kochem et al. |
| 5,300,575 | A | 4/1994 | Jonas et al. |
| 5,391,472 | A | 2/1995 | Muys et al. |
| 5,759,637 | A | 6/1998 | Angelopoulos et al. |
| 5,766,515 | A | 6/1998 | Jonas et al. |

FOREIGN PATENT DOCUMENTS

| | | |
|---|---|---|
| EP | 0 570 795 B1 | 8/1993 |
| EP | 0 945 759 A2 | 9/1999 |

OTHER PUBLICATIONS

Feldhues, et al., "Polyalkoxythiophenes, Soluble Electrically Conducting Polymers", p. C487–C493 (1989).
Marani, et al. "New Synthesis Method of Polythiophenes", p. 2–12 (1994).
Jonas, et al. "Poly(3,4–ethylenedioxythiophene): Conductive Coatings, Technical Applications and Properties", p. 169–173 ( 1995).
Lerch, et al. "Properties and Applications of Baytron (PEDT)", p. 1506–1509 (1998).
Lee, et al., "An Organic/Inorganic Conductive Composites, Pedot/Silicate", p. 595.
Product bulletin for AEROSOL® OT–NV surfactant (1997 Cytec Industries Inc.).
Excerpt on Cyastat® SN.
Excerpt on Sodium Dodecylbenzene Sulfonate.
Excerpt on Sodium Lauryl Sulfate.
Product Information—Hostaphan® 4700 Series Polyester Film.
Product Information—Orgacon™ EL Transparent Conductive Film.
Nippon Shokubai—Product Information for Water–Soluble Conducting Polymers TX–CP Series.
Bayer Info Sheet: Provisional Product Information Sheet: Baytron P, (Apr. 1995).
Bayer Info Sheet: Product Data Sheet: Baytron Technical Information—Baytron for Coating Plastics 1/97.
Bayer Info Sheet: Product Data Sheet: Batyron®: Intrinsically Conductive Coatings, 8/97.
Bayer Info Sheet: Product Data Sheet: Batyron®: Today's Conductivity for Tomorrow's Users 10/97.
Bayer Info Sheet: Product Data Sheet: Baytron P Product Information—Chemical Designation 1/97.
Bayer Info Sheet: Product Data Sheet: Baytron Technical Information—Baytron for Coating Plastics 6/98.
Bayer Info Sheet: Product Data Sheet: Baytron Technical Information—Measuring method for determining the surface resistance of PEDT Coatings, 6/98.
Bayer Info Sheet: Product Data Sheet: Baytron Technical Information—Baytron for Electrostatic Coatings, 6/98.
Bayer Info Sheet: Product Data Sheet: Baytron P Product Information—Chemical Designation, 6/98.
3M Info Sheet: 3M Material Safety Data Sheet for FC–170C Fluorad Brand Fluorochemical Surfactant issued Dec. 18, 1990.
3M Info Sheet: 3M Fluorad™ Fluorosurfactants for Coating Formulations and Household Product Additives issued 10/96.
3M Info Sheet: 3M Fluorad™ Fluorosurfactants—Selection Guide issued 7/98.

*Primary Examiner*—William A. Powell

(57) ABSTRACT

An antistatic polymer film having a coated surface that resists the formation of static. The antistatic coating on the film layer includes a polythiophene, a surfactant and water. The ratio of the surfactant to the polythiophene can be at least about 1:1 by weight of said coating. In addition, the coating can contain less than about 1 percent by weight of polymeric binder and can also contain less than about 1 percent by weight of organic solvent.

30 Claims, No Drawings

ANTISTATIC COATING AND COATED FILM

This application claims priority in U.S. Provisional Application Serial No. 60/286,798, filed on Apr. 26, 2001.

BACKGROUND OF THE INVENTION

1. Field of the Invention

The present invention relates generally to a method for creating a static resistant or conductive product, typically a polymer film, by means of coating the product with a polythiophene and surfactant-based antistatic coating. The antistatic or conductive coating is also disclosed.

2. Description of Related Art

Antistatic coatings are desirable for many applications, such as photographic films, electronics packaging and other types of packaging. Polymeric films, for example, have the tendency to develop built up static charge when subjected to frictional forces in manufacture, processing, conversion, use and the like. An effective antistatic coating can minimize or eliminate any detrimental buildup and discharge of static electricity on the film or other surface. For other applications (including capacitors and the like), the conductivity of the antistatic coating can be employed for other purposes. For many end uses, it is important that an antistatic coating be substantially transparent. However, prior art antistatic coatings have suffered from numerous limitations, including high cost, inadequate transparency, incorporation of organic solvents, need for polymeric binders to provide sufficient adhesion to the substrate and limited antistatic properties. There is a need for antistatic coatings that address one or more of these problems. A need also exists for antistatic coatings that are adapted for application to polymer film substrates. Coatings adapted for in-line application are also desirable.

Polythiophene-based conductive coatings are known in the art. These polymeric conductors have been found to provide good antistatic properties. Their application to polymer films has been explored, alone and in conjunction with certain surface active agents. However, as is conventional in the use of surfactants, typically relatively low levels of surfactants were contemplated or tested in combination with the polythiophene polymers. Moreover, binders, organic solvents or both were used in conjunction with the polythiophene-surfactant combination to create an acceptable coating. Compositions substantially free of binders and organic solvents through the use of high levels of surfactants were not found.

BRIEF SUMMARY OF THE INVENTION

Accordingly, it is an object of the present invention to provide an antistatic coating suitable for application to a base polymer film.

It is a further object of the present invention to provide a base polymer film with an antistatic coating on one or both sides.

It is another object of the present invention to provide an antistatic coating that is substantially free of streaks and smears, particularly when applied to a base polymer film.

It is yet another object of the present invention to provide an antistatic coating that is substantially transparent.

It is yet another object of the present invention to provide a cost-effective antistatic coating with positive performance and antistatic properties.

It is yet another object of the present invention to provide an antistatic coating that is substantially free of organic solvents, and can be applied without the use of significant amounts of organic solvents.

It is a further object of the present invention to provide an antistatic coating containing polythiophenes that does not require a separate polymeric binder to achieve satisfactory adhesion to the film substrate.

The present invention has accomplished these objectives by providing in a preferred embodiment a coated polymer film having a coated surface that resists the formation of static, the film including a polymer film layer, and an antistatic coating on the film layer, where the antistatic coating includes a polythiophene and a surfactant, where said surfactant is present in an amount by weight at least about equal to an amount by weight in which said polythiophene is present.

DETAILED DESCRIPTION OF THE INVENTION

The present inventors have surprisingly found that excellent antistatic properties are provided by a coating that includes a polythiophene polymer and a high level of surfactant. While smaller amounts of surfactant have been considered in the past for use in conjunction with polythiophene polymers, the present inventors have unexpectedly found that by increasing the surfactant content beyond conventional levels, not only is adequate wet-out of the coating on film achieved, but in fact the conductivity and related antistatic performance of the coated film are improved. Furthermore, binders and organic solvents can be avoided or minimized by such use of high surfactant levels.

The antistatic coating of the present invention includes a polythiophene polymer to give antistatic and/or conductive properties to the coating and base polymer film. Polythiophenes are typically dark blue in color. However, due to the extreme thinness of the preferred coating of the present invention, the blue color is not perceptible in a single layer of film. Thus, as discussed later, coatings applied thinly by an in-line process are preferred to thicker, off-line coated layers where the blue color is noticeable, and usually undesirable. One preferred polythiophene is a 3,4-polyethylene dioxythiophene. Other preferred polythiophenes are disclosed in U.S. Pat. No. 5,766,515 to Jonas et al., the disclosure of which is incorporated herein by reference. This polythiophene is commercially available in a dispersion with polystyrene sulfonate from Bayer under the trade name Baytron PH, which contains no organic solvent or polymeric binder. Baytron PH is disclosed to contain 0.8% polystyrene sulfonic acid and 0.5% polythiophene, homogenized in a water base. Alternatively, a two component system of polythiophene and polystyrene sulfonic acid (available from Bayer as Baytron C and Baytron M) can be polymerized to achieve a similar product. Thus, in a preferred embodiment the polythiophene is used in conjunction with a dispersing agent, preferably a polymeric dispersing agent, more preferably a water-dispersible dispersing agent. Polystyrene sulfonic acid is preferred for use as such a dispersing agent.

The polythiophene is preferably present at about 0.08 to about 0.5 percent by weight of the coating solution, and in an alternate preferred embodiment, it is present at about 0.2 to about 0.4 percent by weight of the coating solution. About 0.2 to about 0.3 percent by weight is also preferred. Typically, the amount of polythiophene is minimized to increase cost effectiveness.

When a dispersing agent such as polystyrene sulfonic acid is used, it is preferably present at about 0.1 to about 2 percent by weight of the coating solution, and in an alternate preferred embodiment, it is present at about 0.15 to about 1 percent by weight of the coating solution. As discussed above, the preferred ratio of polystyrene sulfonic acid to polythiophene is 1.6 to 1.

The antistatic coatings of the present invention also include a surfactant or mixture of surfactants. In one preferred embodiment, the antistatic coating contains an anionic surfactant. The anionic surfactant results in a high wetting tension on the surface of the dried coating, and the high wetting tension enables an even application of the polythiophene to the coated surface. The anionic surfactant further enhances the wet-out of the water to maintain a clear, non-charged surface.

Various surfactants have been evaluated for use in conjunction with the polythiophene of the present invention and have been found to be effective. Anionic and nonionic surfactants are preferred. In an alternate preferred embodiment, a fluorosurfactant is included in the antistatic coating of the present invention. Preferably, this fluorosurfactant contains fluoroaliphatic oxyethylenes of carbon chain lengths of about 4 to about 8, and it can also include polyethylene glycol. Such a flurosurfactant is commercially available from 3M as Fluorad FC-170C surfactant, which is nonionic. The fluorosurfactant works beneficially because it minimizes or eliminates the coating streaks that can be caused by certain surfactants. This effect is shown clearly when the coating is applied to a polymer film surface. This is particularly important for antistatic coatings that are applied to clear films for applications such as photographic films and certain types of packaging, where clarity should not be limited by streaks or smears.

Alternate surfactants that are preferred for use in the present invention include sodium lauryl sulfate, an anionic surfactant commercially available from Rhone Poulenc as Sipon UB, and a sulfosuccinate blend, an anionic surfactant commercially available from Cytec Industries available as Aerosol OT/NV. While this blend is proprietary, it is indicated to be covered by U.S. Pat. No. 5,512,211, the disclosure of which is incorporated herein by reference. A similar surfactant, Aerosol OT, is also commercially available from Cytec Industries, and is a sodium dioctyl sulfosuccinate. The nonionic surfactant octoxynol-40 commercially available from Union Carbide as Triton X-405 is also preferred for use herein.

As discussed above, the amount of surfactant used has been found to be critical to the antistatic and conductive performance of the coating. In accordance with the present invention, the surfactant component is preferably present at about 0.1 to about 5 weight percent of the antistatic coating composition. Even higher levels can be used, however they typically result in an increase in haze, which is undesirable for many applications. In an alternate preferred embodiment, the surfactant component makes up about 0.1 to about 3.2 weight percent of the coating. It has been surprisingly found that the fluorosurfactant provides optimal results when present at about 1 to about 1.5 weight percent. With regard to the relative levels of polythiophene and surfactant, it is preferable that the surfactant be present at about one to about 10 times by weight of the polythiophene. Alternatively, the surfactant is present at about four to about six times by weight the weight percent of polythiophene. Without intending to be bound by theory, it is believed that this synergistic effect is unrelated to any hygroscopic activity of the surfactant, as the coating's performance has been found to be unrelated to ambient humidity.

The preferred coatings of the present invention do not include significant amounts of organic solvents. Most preferably, the coatings are substantially free of organic solvents. Alternatively, the coatings of the present invention preferably include less than about 10% organic solvents, or less than about 5%, or alternatively less than about 1% by weight. Water-based coatings are preferred for health and safety reasons, due to the elimination or reduction of potentially hazardous solvents. Water-based coatings are also cost-effective. The ingredients of the antistatic coating are preferably formulated as a dispersion in water or a water-containing solvent. However, alcohols or other suitable organic solvents can be employed, alone or in combination with water. The solids level is preferably up to about 6 weight percent, alternatively about 0.5 to about 4 weight percent, or about 1.5 to about 2.5 weight percent.

In preferred embodiments of the present invention, the coating is substantially free of polymeric binders. These binders have been added in the past to thiophene-containing coatings to promote adhesion of the coating to the underlying polymer film substrate. However, these binders can be costly, can affect the properties of the finished film, and can have other drawbacks, such as interrupting the continuous coating film of conductive polythiophene on the surface of the polyester film. Alternatively, coatings of the present invention can contain less than about 10 percent polymeric binder; or less than about 5%, or less than about 1% by weight. The high surfactant compositions of the present invention do not rely on the use of substantial amounts of polymeric binder to permit adhesion of the coating to the substrate.

In addition, a slip agent is preferably incorporated into the antistatic coating of the present invention. The slip agent is believed to enhance the ability of the coated film to wind smoothly during the manufacturing process. The slip agent is preferably inorganic. More preferably, the slip agent includes colloidal $SiO_2$, most preferably the product commercially available as Nalco 1034A® colloidal $SiO_2$ from the Nalco Chemical Company. Other slip agents that are preferred for use in the present invention include silica in one or more of its various morphological forms, including those commercially available as Syloid® silica or Rapidup® silica, although due to their larger particle size, they are less preferred for uses in which clarity and low haze are needed. Moreover, a combination of two or more of the foregoing slip agents is also preferred for use. The slip agent is preferably present at about 0.05 to about 2 weight percent of the antistatic coating. In an alternate preferred embodiment, the slip agent is present at about 0.05 to about 0.5 weight percent, or in a third preferred embodiment at about 0.1 weight percent.

Conventional additives that are known in the art can be included in the antistatic coatings of the present invention. For example, pigments, other colorants, stabilizers, other antistatic agents, adhesion promoters, antioxidants, delusterants, fillers, plasticizers and the like can be included in the antistatic coatings of the present invention.

The preferred solids level of the antistatic coating, as it is applied to the base polymer film, is a level sufficient to yield a final dry coating thickness within the range of about 0.001 microns to about 0.1 microns, alternatively about 0.005 microns to about 0.05 microns.

Antistatic properties are typically determined on the basis of surface resistance or resistivity of the coated film. This is conventionally measured in ohms per square. Films having a surface resistivity of approximately $10^{11}$ ohms per square are generally considered to have preferred antistatic performance. A surface resistivity of approximately $10^9$ ohms per square is also considered preferred, with surface resistivity figures of about $10^8$ ohms per square alternately being considered preferred. Thus, films of the present invention preferably have a surface resistivity of about $10^{11}$ ohms per square or less, with measurements of about $10^9$ or less and about $10^8$ or less being alternately preferred.

The coating compositions of the present invention can be formulated by simply combining the desired coating components. Agitation may be used to insure an even dispersion or solution. Although the order of mixing is not critical, a preferred method follows: 1. Dilute Baytron PH in deionized water, 2. While mixing, add surfactant, 3. While mixing, add colloidal silica. The most significant feature of mixing is ideally to maintain the acid pH of the mixture for overall stability of the coating, as the polystyrene sulfonic acid component is acidic. Surfactants are generally stable in acid or alkaline media, but colloidal silica is generally alkaline stable. Nalco 1034A is preferred for its unusual acid stability.

Base Film

For many preferred uses of the coating and method of the present invention, a polymer film substrate is most useful. It provides a lightweight, substantially transparent, inexpensive, disposable or recyclable substrate that accommodates many of the end uses of static resistant materials. In addition, the coated polymer film can also easily be laminated by heat bonding or by adhesives to various other substrates.

The antistatic coatings and coating methods of the present invention are applicable to any polymeric film capable of acting as a substrate for an antistatic coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate. Such laminates include polymer—polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

Alternate Substrates

As discussed above, the coatings and methods of reducing static of the present invention are not limited to use on polymer film bases. Alternate substrates such as metals, glass, polymeric articles and the like can be coated according to the teachings of the present invention. Furthermore, it is envisioned that polymer films coated with the coatings of the present invention can also be applied to other surfaces, including irregular surfaces, to provide antistatic properties to those surfaces. The film may be heat bonded or adhered to the surface, or can be mechanically attached via fasteners, clips and the like.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 3.0 to 9.0 watts per square foot per minute is typically sufficient to achieve the desired results. In addition, primer or other intermediate layers can optionally be used between the polymer film and the antistatic coating.

In light of the foregoing, a preferred method of controlling static formation on polymer film is provided herein. Preferably, one or both faces of a base polymer film are coated with an antistatic coating of the present invention. Optionally, if only one face is coated with the antistatic coating of the present invention, this coating can occur before, after or at the same time the opposite face of the base polymer film is coated with an alternate coating. The antistatic coating is preferably not overcoated with another coating. Such a top coating could limit the ability of the antistatic coating to prevent static.

EXAMPLES

The following Examples demonstrate various aspects of certain preferred embodiments of the present invention, and are not to be construed as limitations thereof. The formulations of the individual samples are shown in the charts below. In each example, the listed coating samples were formulated and coated in-line on biaxially oriented polyester film. Specifically, biaxially oriented and heat set PET film was coated in-line between draw steps film with the following sample coatings. In all of the following examples, antistatic performance was tested by conditioning the samples to about 50% relative humidity at about 73 degrees Fahrenheit. The samples were then tested for surface resistivity using approximately 10 (or 5, where noted) volts of electricity (vs. the standard 500 volts) using ASTM D257. Where tape peel tests were performed (a criterion important for, e.g., films used as layout base for printing plate masters in the graphic arts), the following method was used: A one inch wide strip of the 3M Scotch® 616 brand adhesive tape is applied to the coated surface of the polyester film and the tape is separated at a speed of 12 inches/minute with an angle of separation between the tape and film of approximately 90°. A tape peel force of 454 g/inch or higher is acceptable adhesion for layout base, with measurements of about 800 to about 1100 g/inch being preferred. Total haze and transmission were determined using ASTM D 1003. Coefficient of friction was determined using ASTM D 1894.

EXAMPLE SERIES A

| Ex. | Coating Formulation | Wt. Percent Thiophene | Wt. Percent Surfactant | Average Surface Resistivity (ohms/sq) | Coefficient of Friction *(Static/Kinetic) | PST Tape Peel (g/in) | Total Haze (%) | Transmission (%) |
|---|---|---|---|---|---|---|---|---|
| A-1 | 0.2% Baytron PH + 0.1% FC-170C | 0.08 | 0.1 | $9.95 \times 10^{12}$ | .37/.40 (.42/.42) | 1028.4 | 1.34 | 90.6 |
| A-2 | 0.2% Baytron PH + 0.2% FC-170C | 0.08 | 0.2 | $2.96 \times 10^{12}$ | N/A | N/A | N/A | N/A |
| A-3 | 0.2% Baytron PH + 0.4% FC-170C | 0.08 | 0.4 | $6.03 \times 10^{11}$ | .45/.42 (.48/.45) | 1019.4 | 1.20 | 90.3 |
| A-4 | 0.2% Baytron PH + 0.4% FC-170C + 0.1% Nalco 1034A | 0.08 | 0.4 | $4.4 \times 10^{11}$ | N/A | N/A | N/A | N/A |
| A-5 | 0.2% Baytron PH + 0.8% FC-170C | 0.08 | 0.8 | $2.5 \times 10^{10}$ | .44/.44 (.45/.42) | 975.2 | 1.10 | 90.4 |
| A-6 | 0.4% Baytron PH + 0.1% FC-170C | 0.15 | 0.1 | $2.13 \times 10^{10}$ | .35/.36 (.37/.40) | 1067.4 | 1.41 | 90.1 |
| A-7 | 0.4% Baytron PH + 0.2% FC-170C | 0.15 | 0.2 | $9.16 \times 10^{9}$ | N/A | N/A | N/A | N/A |
| A-8 | 0.4% Baytron PH + 0.4% FC-170C | 0.15 | 0.4 | $5.1 \times 10^{9}$ | .40/.39 (.43/.41) | 1024.8 | 1.90 | 90.2 |
| A-9 | 0.4% Baytron PH + 0.4% FC-170C + 0.1% Nalco 1034A | 0.15 | 0.4 | $4.26 \times 10^{9}$ | N/A | N/A | N/A | N/A |
| A-10 | 0.4% Baytron PH + 0.8% FC-170C | 0.15 | 0.8 | $2.33 \times 10^{9}$ | .44/.45 (.42/.42) | 1022.3 | 0.93 | 90.1 |
| A-11 | 0.6% Baytron PH + 0.1% FC-170C | 0.23 | 0.1 | $1.88 \times 10^{10}$ | .37/.36 (.39/.40) | 1049.0 | 1.73 | 90.4 |
| A-12 | 0.6% Baytron PH + 0.2% FC-170C | 0.23 | 0.2 | $6.16 \times 10^{9}$ | N/A | N/A | N/A | N/A |
| A-13 | 0.6% Baytron PH + 0.4% FC-170C | 0.23 | 0.4 | $1.02 \times 10^{10}$ | .40/.38 (.40/.38) | 1050.1 | 1.21 | 90.2 |
| A-14 | 0.6% Baytron PH + 0.4% FC-170C + 0.1% Nalco 1034A | 0.23 | 0.4 | $3.23 \times 10^{9}$ | N/A | N/A | N/A | N/A |
| A-15 | 0.6% Baytron PH + 0.8% FC-170C | 0.23 | 0.8 | $9.66 \times 10^{8}$ | .44/.44 (.43/.40) | 1007.7 | 0.95 | 90.3 |
| A-16 | 4% Baytron CPUD2 + 0.1% FC-170C | | 0.1 | $1.63 \times 10^{14}$ | N/A | N/A | N/A | N/A |
| A-17 | 4% Baytron CPUD2 + 0.2% FC-170C | | 0.2 | $1.07 \times 10^{11}$ | N/A | N/A | N/A | N/A |

*First coefficient of friction values are coated side/coated side, second values (in parentheses) are coated side/uncoated backside This series demonstrates that at higher surfactant concentrations (for example, at about 0.1 percent and higher), viable antistatic films are created, even without the use of organic solvents or polymeric binders. As the relative proportion of surfactant versus thiophene is increased, the surface resistivity decreases. Desirable friction, adherence to 3M Scotch® brand 616 adhesive tape and optical properties are achieved. The slip additive does not negatively impact surface resistivity, and in fact appears to provide a slight improvement. Baytron CPUD, which is a blend of a polyurethane polymer with Baytron PH, has less preferred antistatic performance relative to Baytron PH alone. However, even with Baytron CPUD, the surface resistivity is reduced with an increase in the level of FC-170C fluorosurfactant.

EXAMPLE SERIES B

| Ex. | Coating Formulation | Wt. Percent Thiophene | Wt. Percent Surfactant | Average Surface Resistivity (ohms/sq) | Coefficient of Friction *(Static/Kinetic) front to back | PST Tape Peel (g/in) | Total Haze (%) | Transmission (%) |
|---|---|---|---|---|---|---|---|---|
| B-1 | 0.6% Baytron PH + 0.8% FC-170C | 0.23 | 0.8 | $1.3 \times 10^9$ | .56/.46 | 1006.8 | 0.80 | 90.3 |
| B-2 | 0.6% Baytron PH + 1.2% FC-170C | 0.23 | 1.2 | $3.23 \times 10^8$ | .54/.45 | 947.7 | 0.76 | 90.5 |
| B-3 | 0.6% Baytron PH + 1.8% FC-170C | 0.23 | 1.8 | $4.10 \times 10^8$ | .43/.43 | 950.6 | 0.87 | 90.5 |
| B-4 | 0.8% Baytron PH + 1.0% FC-170C | 0.30 | 1.0 | $2.83 \times 10^8$ | .42/.42 | 952.7 | 1.01 | 90.2 |

This series and Series C demonstrate the further and unexpected improvements in surface resistivity that are achieved through increased levels of surfactant.

EXAMPLE SERIES C

| Ex. | Coating Formulation | Wt. Percent Thiophene | Wt. Percent Surfactant | Average Surface Resistivity (ohms/sq) at 10 and 5 volts* | PST Tape Peel (g/in) |
|---|---|---|---|---|---|
| C-1 | 0.4% Baytron PH + 0.4% FC-170C + 0.1% Nalco 1034A | 0.15 | 0.4 | $1.9 \times 10^{10}$/ $2.85 \times 10^{12}$ | 918 |
| C-2 | 0.8% Baytron PH + 0.8% FC-170C + 0.1% Nalco 1034A | 0.30 | 0.8 | $2.28 \times 10^9$/ $1.23 \times 10^9$ | 887 |
| C-3 | 0.4% Baytron PH + 0.8% FC-170C + 0.1% Nalco 1034A | 0.15 | 0.8 | $4.43 \times 10^8$/ $5.80 \times 10^8$ | 892 |
| C-4 | 0.8% Baytron PH + 1.6% FC-170C + 0.1% Nalco 1034A | 0.30 | 1.6 | $6.87 \times 10^7$/ $1.16 \times 10^8$ | 841 |
| C-5 | 0.4% Baytron PH + 0.4% FC-170C + 0.5% Nalco 1034A | 0.15 | 0.4 | $9.26 \times 10^9$/ $9.20 \times 10^9$ | 929 |
| C-6 | 0.8% Baytron PH + 0.8% FC-170C + 0.5% Nalco 1034A | 0.30 | 0.8 | $3.57 \times 10^8$/ $3.96 \times 10^8$ | 910 |
| C-7 | 0.4% Baytron PH + 0.8% FC-170C + 0.5% Nalco 1034A | 0.15 | 0.8 | $8.70 \times 10^8$/ $1.70 \times 10^9$ | 832 |
| C-8 | 0.8% Baytron PH + 1.6% FC-170C + 0.5% Nalco 1034A | 0.30 | 1.6 | $9.00 \times 10^7$/ $1.21 \times 10^8$ | 863 |
| C-9 | 0.8% Baytron PH + 1.6% FC-170C + 0.5% Nalco 1034A | 0.30 | 1.6 | $1.46 \times 10^8$/ $6.10 \times 10^7$ | 848 |
| C-10 | 0.6% Baytron PH + 1.2% FC-170C | 0.23 | 1.2 | $4.40 \times 10^8$/ $7.60 \times 10^8$ | 844 |
| C-11 | 0.6% Baytron PH + 1.2% FC-170C + 0.1% Nalco 1034A | 0.23 | 1.2 | $1.08 \times 10^8$/ $9.4 \times 10^7$ | 850 |
| C-12 | 0.6% Baytron PH + 1.2% FC-170C + 0.5% Nalco 1034A | 0.23 | 1.2 | $1.1 \times 10^8$/ $2.20 \times 10^8$ | 850 |
| C-13 | 1% Baytron PH + 2% FC-170C + 0.5% Nalco 1034A | 0.38 | 2 | $1.13 \times 10^8$/ $1.16 \times 10^8$ | 867 |

-continued

EXAMPLE SERIES C

| Ex. | Coating Formulation | Wt. Percent Thiophene | Wt. Percent Surfactant | Average Surface Resistivity (ohms/sq) at 10 and 5 volts* | PST Tape Peel (g/in) |
|---|---|---|---|---|---|
| C-14 | 0.6% Baytron PH + 0.03 Nalco 1034A + 0.16% TEG | 0.23 | 0 | Not tested due to poor wetting | |
| C-15 | 0.6% Baytron PH + 1.2% FC-170C + 0.3% Nalco 1034A + 0.16% TEG | 0.23 | 1.2 | $2.16 \times 10^8$ / $1.10 \times 10^8$ | 943 |

TEG = Triethylene glycol
*10 volts is the first value and 5 volts is the second value.

This Series of examples further demonstrates that tape peel properties can be optimized by the use of higher levels of surfactant.

EXAMPLE SERIES D

| Ex. | Coating Formulation | Wt. Percent Thiophene | Wt. Percent Surfactant | Average Surface Resistivity (ohms/sq) | PST Tape Peel (g/in) | Total Haze (%) | Transmission (%) |
|---|---|---|---|---|---|---|---|
| D-1 | 4% VTL-72 + 1.6% TEG + 0.4% Baytron PH + 0.8% FG-170C + 0.25% Nalco 1034A | 0.15 | 0.8 | $7.26 \times 10^8$ | 967 | 1.69 | 91.8 |
| D-2 | 2% VTL-72 + 0.8% TEG + 0.2% Baytron PH + 0.4% FG-170C + 0.25% Nalco 1034A | 0.08 | 0.4 | $1.21 \times 10^{11}$ | 972 | 1.29 | 90.7 |
| D-3 | 1% VTL-72 + 0.4% TEG + 0.1% Baytron PH + 0.2% FC-170C + 0.25% Nalco 1034A | 0.04 | 0.2 | $3.51 \times 10^{15}$ | 970 | 0.91 | 91.0 |
| D-4 | 4% VTL-72 + 0.8% TEG + 0.4% Baytron PH + 0.8% FC-170C + 0.25% Nalco 1034A | 0.15 | 0.8 | $2.46 \times 10^8$ | 938 | 2.64 | 91.9 |
| D-5 | 2% VTL-72 + 0.4% TEG + 0.2% Baytron PH + 0.4% FC-170C + 0.25% Nalco 1034A | 0.08 | 0.4 | $4.86 \times 10^{10}$ | 1013 | 0.93 | 91.1 |
| D-6 | 1% VTL-72 + 0.2% TEG + 0.1% Baytron PH + 0.2% FC-170C + 0.25% Nalco 1034A | 0.04 | 0.2 | $6.73 \times 10^{13}$ | 1014 | 0.90 | 91.1 |
| D-7 | 4% VTL-72 + 0.4% TEG + 0.4% Baytron PH + 0.8% FC-170C + 0.25% Nalco 1034A | 0.15 | 0.8 | $2.53 \times 10^8$ | 856 | 8.12 | 91.7 |

-continued

EXAMPLE SERIES D

| Ex. | Coating Formulation | Wt. Percent Thiophene | Wt. Percent Surfactant | Average Surface Resistivity (ohms/sq.) | PST Tape Peel(g/in) | Total Haze (%) | Transmission (%) |
|---|---|---|---|---|---|---|---|
| D-8 | 2% VTL-72 + 0.2% TEG + 0.2% Baytron PH + 0.4% FC-170C + 0.25% Nalco 1034A | 0.08 | 0.4 | $4.03 \times 10^{10}$ | 991 | 1.34 | 90.8 |
| D-9 | 1% VTL-72 + 0.1% TEG + 0.1% Baytron PH + 0.2% FC-170C + 0.25% Nalco 1034A | 0.04 | 0.2 | $3.26 \times 10^{15}$ | 1015 | 0.93 | 91.1 |
| D-10 | 0.8% Baytron PH + 1.6% FC-170C + 0.1% Nalco 1034A | 0.30 | 1.6 | $3.90 \times 10^8$ | 913 | 1.04 | 90.3 |
| D-11 | 0.8% Baytron PH + 2.4% FC-170C + 0.1% Nalco 1034A | 0.30 | 2.4 | $8.26 \times 10^8$ | 913 | 1.36 | 90.2 |
| D-12 | 0.8% Baytron PH + 3.2% FC-170C + 0.1% Nalco 1034A | 0.30 | 3.2 | $3.80 \times 10^8$ | 916 | 1.25 | 90.2 |

VTL-72, (Versa-TL72, from National Starch) = polystyrene sulfonic acid

This Example Series demonstrates that the further addition of polystyrene sulfonic acid above the levels present in the Baytron PH does not provide enhanced surface resistivity. Furthermore, as shown in Examples D-11 and D-12, beyond a certain surfactant level no appreciable improvement in surface resistivity is detected.

EXAMPLE SERIES E

| Ex. | Coating Formulation | Wt. Percent Thiophene | Wt. Percent Surfactant | Average Surface Resistivity (ohms/sq) at 20% RH, 25° C. | Average Surface Resisitivity (ohms/sq) at 50% RH, 25° C. |
|---|---|---|---|---|---|
| E-1 | 0.8% Baytron PH + 1.6% FC-170C + 0.1% Nalco 1034A | 0.30 | 1.6 | $3.5 \times 10^9$ | $4.4 \times 10^9$ |
| E-2 | 0.8% Baytron PH + 1.6% FC-170C + 0.1% Nalco 1034A | 0.30 | 1.6 | $1.5 \times 10^9$ | $1.8 \times 10^9$ |
| E-3 | 0.6% Baytron PH + 1.2% FC-170C + 0.1% Nalco 1034A | 0.23 | 1.2 | $4.2 \times 10^7$ | $4.9 \times 10^7$ |
| E-4 | 0.6% Baytron PH + 1.2% Sipon UB + 0.1% Nalco 1034A | 0.23 | 1.2 | $2.8 \times 10^6$ | $8.6 \times 10^6$ |
| E-5 | 0.6% Baytron PH + 1.2% Triton X-405 + 0.1% Nalco 1034A | 0.23 | 1.2 | $1.0 \times 10^7$ | $1.1 \times 10^7$ |

This test series demonstrates that the surface resistivity values are equivalent at the two tested relative humidity levels, indicating that the film surface is truly conductive, unlike many known antistatic films that are humidity dependent. Examples E-4 and E-5 demonstrate the excellent properties of alternate preferred surfactants in the coatings of the present invention.

The present invention having been thus described with particular reference to the preferred forms and embodiments thereof, it will be obvious to one of ordinary skill in the art that various changes and modifications may be made therein without departing from the spirit and scope of the invention as defined in the appended claims.

What is claimed is:

1. A polymer film having a coated surface that resists the formation of static, said film comprising:

a polymer film layer, and an antistatic coating on said film layer, wherein said coating includes a polythiophene, a surfactant and water, a ratio of said surfactant to said polythiophene is at least about 1:1 by weight of said coating, said coating contains less than about 1 percent by weight of polymeric binder; and said coating contains less than about 1 percent by weight of organic solvent.

2. The film of claim 1, wherein said antistatic coating is substantially transparent.

3. The film of claim 1, wherein said polythiophene is 3,4-polyethylene dioxythiophene.

4. The film of claim 1, wherein said film has a PST Tape Peel measurement of about 800 to about 1100 grams per inch.

5. The film of claim 1, wherein said surfactant includes a fluorosurfactant.

6. The film of claim 5, wherein said fluorosurfactant includes fluoroaliphatic oxyethylenes of carbon chain lengths of about 4 to about 8.

7. The film of claim 1, wherein said polymer includes polyester.

8. The film of claim 1, wherein said polythiophene is present at about 0.08 to about 0.5 weight percent of said antistatic coating.

9. The film of claim 1, wherein said polythiophene is present at about 0.2 to about 0.4 weight percent of said antistatic coating.

10. The film of claim 1, wherein said surfactant is present at about 0.1 to about 3.2 weight percent of said antistatic coating.

11. The film of claim 1, wherein said surfactant is present at about 1 to about 2 weight percent of said antistatic coating.

12. The film of claim 1, wherein said surfactant includes an anionic surfactant.

13. The film of claim 1, wherein said surfactant includes a nonionic surfactant.

14. The film of claim 1, wherein said surfactant includes an octoxynol-40.

15. The film of claim 1, wherein said surfactant includes sodium lauryl sulfate.

16. The film of claim 1, wherein said surfactant includes a sulfosuccinate.

17. The film of claim 1, further comprising a slip agent.

18. The film of claim 17, wherein said slip agent includes at least one silica.

19. The film of claim 17, wherein said slip agent includes colloidal $SiO_2$.

20. The film of claim 17, wherein said slip agent is present at about 0.05 to about 2 weight percent of said antistatic coating.

21. The film of claim 1, wherein said antistatic coating has a solids level of about 0.5 to about 4 weight percent.

22. The film of claim 1, wherein said antistatic coating has a dry coating thickness of about 0.001 microns to about 0.1 microns.

23. The film of claim 1, wherein said antistatic coating has a coating thickness of about 0.005 microns to about 0.05 microns.

24. The film of claim 1, wherein said coating has a surface resistivity of about $1 \times 10^{11}$ to about $1 \times 10^6$ ohms per square.

25. The film of claim 1, wherein said coating further comprises a polystyrene sulfonic acid.

26. The film of claim 25, wherein said polystyrene sulfonic acid is present at about 0.1 to about 2 weight percent of the coating.

27. A process for controlling the formation of static on a surface, said process comprising:

coating said surface with an antistatic coating containing a polythiophene and a surfactant, wherein said surfactant is present at about 0.1 to about 3.2 weight percent of said coating.

28. The process of claim 27, wherein said coating is coated on a polymer film surface.

29. The process of claim 27, wherein said coating of said surface is accomplished by in-line coating.

30. The process of claim 27, wherein said coating is maintained in a substantially acid state.

\* \* \* \* \*